(12) United States Patent
Moebus

(10) Patent No.: US 6,247,285 B1
(45) Date of Patent: Jun. 19, 2001

(54) FLOORING PANEL

(76) Inventor: Maik Moebus, Mühlbacher Strasse 1, 01561 Lampertswalde (DE)

( * ) Notice: Subject to any disclaimer, the term of this patent is extended or adjusted under 35 U.S.C. 154(b) by 0 days.

(21) Appl. No.: 09/262,479

(22) Filed: Mar. 4, 1999

(51) Int. Cl.[7] .................................................. E04B 5/02
(52) U.S. Cl. ........................... 52/589.1; 52/590.1; 52/480; 52/535; 52/539; 403/381; 403/387
(58) Field of Search ............................. 52/589.1, 590.1, 52/480, 535, 539; 403/381, 387, 298

(56) References Cited

U.S. PATENT DOCUMENTS

| | | | |
|---|---|---|---|
| 3,535,844 | * | 10/1970 | Glaros ........................................ 52/595 |
| 3,623,261 | * | 11/1971 | Freese ................... 52/589.1 X |
| 4,104,840 | * | 8/1978 | Heintz et al. ......................... 52/309.9 |
| 4,304,080 | * | 12/1981 | Freeman ................................. 52/309.9 |
| 4,471,012 | | 9/1984 | Maxwell . |
| 4,907,383 | * | 3/1990 | Winter, IV ................................. 52/86 |
| 5,113,632 | * | 5/1992 | Hanson ..................................... 52/385 |
| 5,381,638 | * | 1/1995 | Anderson ......................... 52/589.1 X |
| 5,755,068 | * | 5/1998 | Ormiston ......................... 52/589.1 X |
| 5,797,237 | * | 8/1998 | Finkell, Jr. ............................. 52/589.1 |
| 5,899,251 | * | 5/1999 | Turner ............................. 52/590.1 X |
| 6,006,486 | * | 12/1999 | Moriau et al. ......................... 52/589.1 |

FOREIGN PATENT DOCUMENTS 0690185   1/1996   (EP) .
2618826   7/1987   (FR) .

* cited by examiner

*Primary Examiner*—Beth A. Stephan
*Assistant Examiner*—Phi Dieu Tran A
(74) *Attorney, Agent, or Firm*—Renner, Otto, Boisselle & Sklar, LLP

(57) ABSTRACT

There is disclosed a flooring panel which comprises a supporting plate made of wood material and provided on at least one face with a covering. The supporting plate is provided at its edges with tongues and grooves which fit into and onto corresponding grooves and tongues on further similar panels. Each edge of the supporting plate has both a groove and a tongue to provide a firm connection.

3 Claims, 1 Drawing Sheet

FLOORING PANEL

Figure 1:
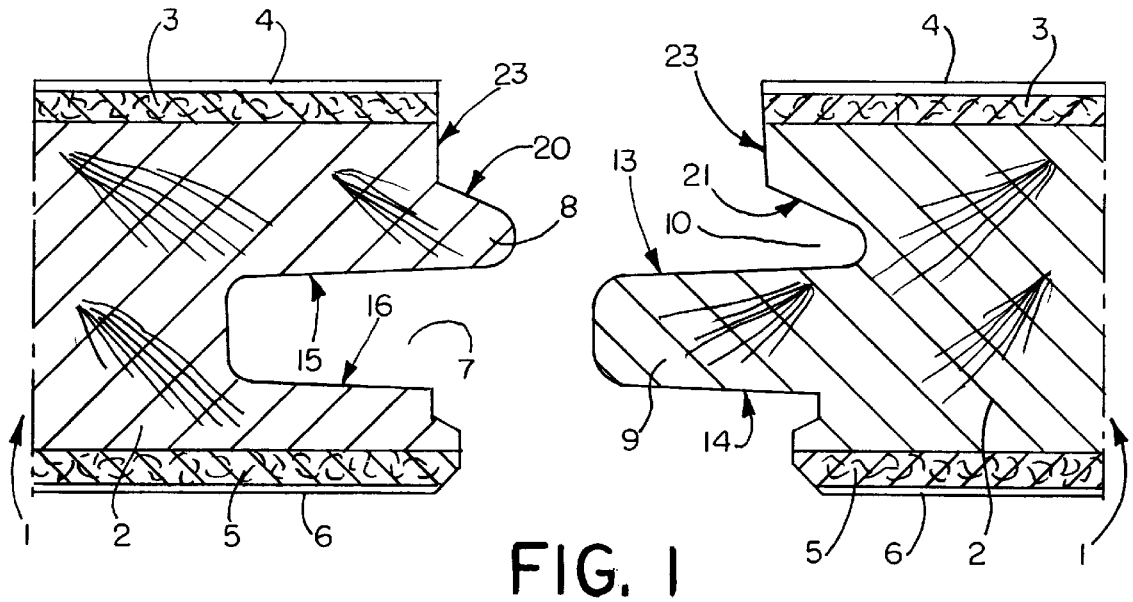

The invention relates to a panel designed in particular for flooring and comprising a supporting plate made of wood material provided on at least one face with a covering, the plate having a tongue on at least one edge, and a groove on at least one other edge, fitting into corresponding grooves and tongues of further similar panels.

When such panels are laid to form a floor, glue is applied to the upper surface of the tongues of each panel before the tongues are inserted in the corresponding grooves of the adjacent panels. The glue applied to the tongues is squeezed out when they are inserted in a groove of an adjacent panel. It spreads into the groove, which is deeper than the length of the tongue, and also reaches the faces of the assembled panels. The glue is then not only in the area of contact between the surface of the tongue and the opposing wall of the groove but also at the joints between the assembled panels. Glue which comes out onto the faces of the assembled panels has to be removed by wiping it off.

Because of the varying manufacturing tolerances of the panels, in particular the interengaging tongues and grooves, it is necessary to provide undercuts in the region of the meeting point between the tongues and the faces or edges of the panels, and for the depth of the grooves to be greater than the length of the tongues. The area available for an adhesive bond between the tongues and grooves and the mutually meeting faces or edges of the panels which are to be fitted and bonded together is therefore relatively small.

As a result of this problem there are frequently faults or weak points in floors assembled from such panels. This leads to the adhesive zones between panels becoming at least partially torn, so that tears or other openings arise in the floor, through which atmospheric moisture and in particular water used for cleaning can penetrate. Once moisture has penetrated into the joints between adjacent panels the wood material of the panels starts to warp, which ultimately leads to warping of the floor which has been laid. When such a floor has become damaged it cannot be repaired, but has to be completely replaced.

Such damage to flooring made of these panels arises as a result of poor quality laying. It can also arise when the panels have been carefully and expertly laid on a carefully prepared substrate but where the supporting ground is at all uneven. Any alterations in the supporting ground and unevenness in the supporting ground, for example through settlement in the building in which the floor is laid, which arise after the floor is laid can also damage the flooring.

An aim of the invention is to solve the problem of improving the connection between tongue and groove flooring panels to be laid adjacent to one another, in such a way that even when there is unevenness present in the substrate or unevenness arises after the laying of the floor, no damage can occur in the region of the joints between the panels, such as could lead over a period of time to the entire floor requiring to be replaced.

According to the present invention, a panel, in particular for floor coverings, comprises a supporting plate of wood material, said supporting plate being provided on at least one face with a covering and said supporting plate being provided on at least one edge with a combination of a tongue and a groove, and on at least one other edge with a combination of a groove and a tongue, said tongue and groove combination on said one edge fitting with said groove and tongue combination on said other edge of a further said panel.

The invention provides a double tongue and groove connection for flooring panels which allows increased contact areas at the joints in comparison with conventional glued tongue and groove connections and thereby allows greater areas for gluing. This provides improved retention and stability between the assembled and glued panels, where they are laid on a substrate which is not quite flat. The invention also allows faults in the laying to be largely overcome.

Other features of the invention appear in the subsidiary claims.

An embodiment by way of example of panels made in accordance with the invention is illustrated diagrammatically in the drawing, in which:

FIG. 1 is a cross-section of two adjacent flooring panels according to the invention designed for connection by mutual insertion, shown before they are brought together, and FIG. 2 is a cross-section through the assembled-together panels of FIG. 1, showing the glued regions.

As shown in the drawings, panel 1 comprises a supporting plate 2 made of a wood material such as H D F (high density fibre), M D F (medium density fibre) or plywood, which is provided on its upper face with a covering serving as the floor surface. The covering may for example comprise a coating layer 3 of compressed paper, and a wear-resistant transparent covering layer 4 provided over the coating layer 3.

Each supporting plate 2 is provided on its underside with a further covering for stability and comprising a coating layer 5 provided under a covering layer 6. The covering layer 6 however does not need to be transparent because the coating layer 5 does not, like the coating layer 3, form a decorative surface.

Each panel 1 is rectangular in shape, and has at one longitudinal edge and an adjacent end edge a continuous and slightly inwardly tapering deep groove 7. The groove 7 extends along the length of each edge, and has rounded corners. It is adjacent the underside of the panel. The same edges also have, adjacent the upper face of the panel 1, an outwardly projecting wedge-shaped nose 8 which serves as a tongue. The depth of the groove 7 is greater than the amount by which the nose 8 projects from the edge.

Figure 2:
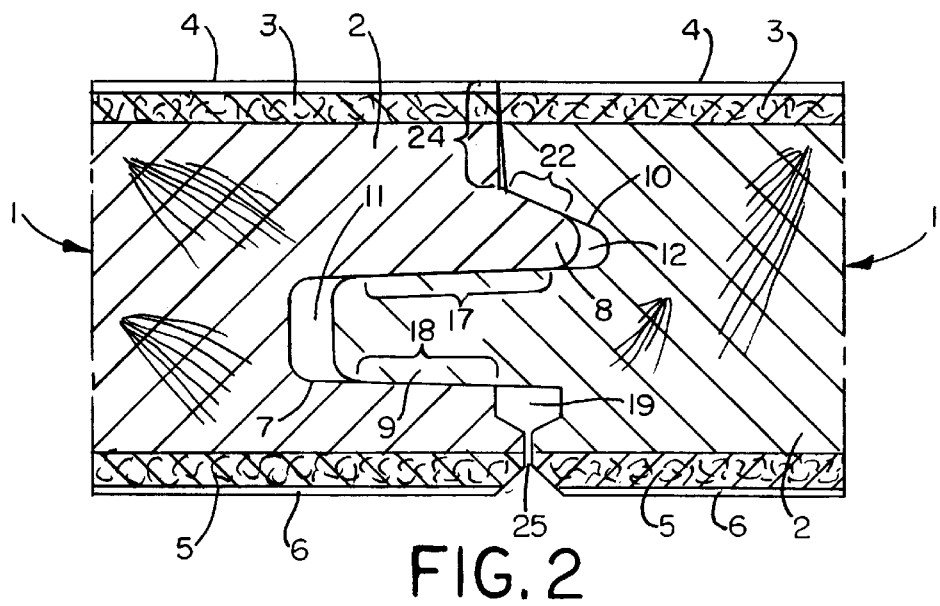

On its second longitudinal edge and its second end edge each panel 1 is provided with a longitudinally-extending tapering tongue 9 fitting into the deep groove 7 of a similar panel. The tongue 9 is adjacent the underside of the panel 11. Adjacent the upper face there is a wedge-shaped groove 10 into which the wedge-shaped nose 8 of a similar panel 1 fits. FIG. 2 shows how the tapering tongue 9, which has a rounded end, fits into a groove 7 and the wedge-shaped nose 8 fits into a wedge-shaped groove 10 belong to panel 1.

Each nose 8 is shorter than the depth of the associated groove 10 and each tongue 9 is shorter than the depth of the associated groove 7, so that a respective free space 11 or 12 remains in each groove 7, 10 when two panels are caused to interengage as shown in FIG. 2.

When a floor is laid using panels 1 of the kind shown in the drawing, glue is applied to the upper face 13 of each tongue 9. In addition, although it is not necessary in every case, further glue can be applied to the underside 14 of the tongue 9.

When two panels are fitted together from the position shown in FIG. 1 to the position shown in FIG. 2, the upper face 13 of each tongue 9 comes into contact with the upper inside face 15 of each groove 7, just as the underside 14 of the tongue 9 comes into contact with the lower inside face 16 of the tapering groove 7, as shown in FIG. 2. The contact regions 17 and 18 can be seen in FIG. 2.

On assembly of two panels 1 glue on the upper surface 13 and the underside 14 of the tongue 9 is spread out and simultaneously distributed over the contact regions 17 and 18. Surplus glue can spread out into the free spaces 11 and 12 as well as into a further free space 19 between the edges, adjacent the underside of adjacent panels. Surplus glue reaching the free space 12 is forced, on assembly of two panels, onto the upper face 20 of each wedge-shaped nose 8 and the inside face 21 of each wedge-shaped groove 10, so that an additional coating of glue arises in the contact region 22 between the upper face of the wedge-shaped nose 8 and the wedge-shaped groove 10.

Subsequently, as the panels 1 are brought further together, they come into contact with one another also in the region of their vertical edge faces 23 above the noses 8 and grooves 10, so that here also a gluing action takes place in a contact region 24. Surplus glue which emerges from the contact region 24 onto the surface of the assembled panels 1 is wiped off by the person doing the laying after the panels have been fitted together and before it hardens.

At the underside of the assembled panels there is an open gap 25 into which and through which any further excess glue can escape. Contact between the assembled panels 1 is not necessary at this point.

As a result of the particular double tongue and groove connection between the assembled panels 1 illustrated in the drawing and described above the firm connection between the panels achieved with the aid of glue is more stable than one using simple tongue and groove connections so that a floor covering laid using the panels 1 has the necessary stability even where the substrate is not absolutely flat. Accordingly there is no danger that floor coverings laid using the panels 1 could tear apart in the neighbourhood of joints and that moisture could penetrate into the resulting gaps, such as could lead to warping of the floor covering and consequent destruction of the entire floor.

What is claimed is:

1. A panel for floor coverings, comprising a supporting plate of wood material, said supporting plate being provided on at least one face with a top covering and said supporting plate provided on at least one edge with a first combination of an upper tongue and a lower larger groove, and on at least one other edge with a second combination of an upper groove and a lower larger tongue, said first tongue and groove combination on said one edge fitting with said second groove and tongue combination on said other edge of a further said panel, said first tongue and groove combination and said second groove and tongue combination extending along said respective edges, and wherein in each said first and second combination, said groove or tongue remote from said top covering extends further from said edge than said tongue or groove adjacent said top covering.

2. A panel according to claim 1, wherein said grooves and said tongues have a tapering cross-section.

3. A panel according to claim 2, wherein said groove and said tongue adjacent said top covering are wedge-shaped.

\* \* \* \* \*